United States Patent
Kuijper

(10) Patent No.: US 8,064,303 B2
(45) Date of Patent: Nov. 22, 2011

(54) ANALYSIS OF OPTICAL EFFECTS ON STORAGE MEDIUM

(75) Inventor: Maarten Kuijper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 956 days.

(21) Appl. No.: 11/721,821

(22) PCT Filed: Dec. 20, 2005

(86) PCT No.: PCT/IB2005/054327
§ 371 (c)(1),
(2), (4) Date: Jun. 15, 2007

(87) PCT Pub. No.: WO2004/079728
PCT Pub. Date: Sep. 16, 2004

(65) Prior Publication Data
US 2009/0252008 A1    Oct. 8, 2009

(30) Foreign Application Priority Data
Dec. 23, 2004    (EP) .................................... 04106921

(51) Int. Cl.
*G11B 7/00* (2006.01)
(52) U.S. Cl. .................................................. 369/47.53
(58) Field of Classification Search ....... 369/47.5–47.53, 369/53.26, 116, 59.11
See application file for complete search history.

(56) References Cited

U.S. PATENT DOCUMENTS

| | | | | |
|---|---|---|---|---|
| 5,185,733 A | * | 2/1993 | Finkelstein et al. | ....... 369/47.52 |
| 5,475,666 A | * | 12/1995 | Ito et al. | ....... 369/47.52 |
| 5,740,149 A | * | 4/1998 | Iwasaki et al. | ............. 369/47.53 |
| 5,761,179 A | * | 6/1998 | Iwasaki et al. | ............. 369/59.11 |
| 5,793,737 A | * | 8/1998 | Den Boef | ................... 369/47.53 |
| 6,560,190 B1 | | 5/2003 | Lin | |
| 2001/0033534 A1 | | 10/2001 | Takeda et al. | |
| 2002/0114235 A1 | * | 8/2002 | Stek et al. | ................... 369/47.53 |
| 2002/0196719 A1 | * | 12/2002 | Morishima | ................ 369/47.53 |
| 2003/0133377 A1 | | 7/2003 | Lin | |

(Continued)

FOREIGN PATENT DOCUMENTS

JP    2004253016 A    9/2004

(Continued)

OTHER PUBLICATIONS

International Search Report of International Application No. PCT/IB2005/054327 Contained in International Publication No. WO2006067737.

(Continued)

*Primary Examiner* — Thang Tran

(57) ABSTRACT

The invention relates to a method for setting an optimum value of a write parameter for use in an optical recording apparatus for writing information on an optical recording medium by means of a radiation beam. The optimum value of a write parameter is found by deriving a plurality of characteristic write power levels (PChar) from a plurality of curve-fitting functions. Each characteristic write power level (PChar) has an associated initial value of the write power level (TV), and the optimum value of the write parameter is found by comparing the characteristic write power levels to the initial write power levels. The invention also relates to an optical recording apparatus for recording information on an optical recording medium, the apparatus having a radiation source for emitting a radiation beam having a controllable value of a write power level for recording information on the recording medium.

16 Claims, 4 Drawing Sheets

U.S. PATENT DOCUMENTS

Figure 1:
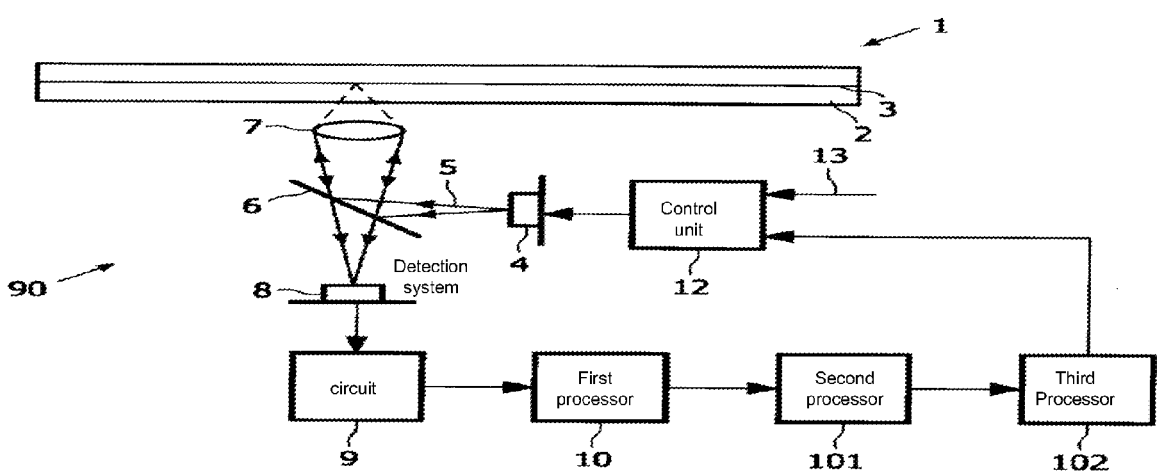

2003/0156515 A1    8/2003   Zhou et al.
2006/0203645 A1*   9/2006   Van Den Hoogen
                            et al. .................... 369/47.53

FOREIGN PATENT DOCUMENTS

| WO | WO02/41306 A1 | 5/2002 |
|---|---|---|
| WO | 2004079728 A1 | 9/2004 |
| WO | WO2004/007978 A1 | 9/2004 |

OTHER PUBLICATIONS

Written Opinion of the International Searching Authority for International Application No. PCT/IB2005/051316.

* cited by examiner

ANALYSIS OF OPTICAL EFFECTS ON STORAGE MEDIUM

The invention relates to a method for setting an optimum value of a write parameter for use in an optical recording apparatus for writing information on an optical recording medium by means of a radiation beam. The invention also relates to an optical recording apparatus for recording information on an optical recording medium, the apparatus comprises a radiation source for emitting a radiation beam having a controllable value of a write power level for recording information on the recording medium. Additionally, the invention relates to an optical recording medium for recording information by irradiating the recording medium by means of a radiation beam, the recording medium comprising an area containing control information indicative of a recording process whereby information can be recorded on said recording medium.

In an optical recording apparatus it is important to record information on optical recording media with the correct power of the laser beam. Though a media manufacturer can give this correct power in an absolute way (for example, pre-recorded on the disc) environment and apparatus-to-apparatus deviations for every recording medium and recording apparatus combination makes it necessary for reliable optical recording to find the correct power dependent of the recording medium in question. Several optimization power control (OPC) routines for this purpose are known in the field, such as the gamma-OPC (for CR-RW), the beta-OPC (for CD-R and DVD+/−R), and the kappa-OPC (for BD-RE/R).

In WO 02/41306, methods are described in which an optimum write power of a radiation beam in an optical recording apparatus is set by writing a series of test patterns on the optical recording medium, forming a read signal from the patterns and processing the read signal. Such processing involves fitting a function, preferably a straight line, to parameters obtained from the read signal without having to perform a differentiation step. One such parameter obtainable from the read signal is the modulation (M). The curve fitting procedure requires one or more power values to define the interval wherein the fitting is to be performed. If the curve fitting results in an first value for a write parameter that does not qualify as the optimum write parameter for some reasons, e.g. out of range of a pre-set value, WO 02/41306 discloses several possible measures to be taken. One such being an iteration procedure, wherein said first value for a write parameter is used to define a second interval wherein the fitting is to be performed. The resulting second write parameter may subsequently be evaluated as an optimum write parameter, e.g. compared to a pre-set range. If the second write parameter does not qualify as the optimum write parameter the iteration may continue on until some pre-set condition is meet.

However, an inherent problem for some combinations of optical recording apparatus and optical recording media is that the iteration may need a relative large amount of iteration steps before an optimum write parameter is obtained. Hence, the recording process may be delayed causing some user discomfort. Moreover, in some unfortunate combinations of optical recording apparatus and optical recording media the iteration may not be convergent towards an optimum write parameter. For such cases, the optical recording apparatus will not be able to record on the recording media resulting in a malfunction.

The disclosure of WO 02/41306 is hereby incorporated in the present application by reference and considered part of the present application.

It may be seen as an object of the present invention to provide a method that solves the above mentioned problems of the prior art with obtaining an optimum value of a write parameter for optical recording on an optical media. From said optimum value of a write parameter an optimum value ($P_{opt}$) of the write power level (P) may be derived. The present invention in particular provides a method for obtaining an optimum value of a write parameter for optical recording on an optical media that is fast because only a relatively limited number of computations is performed.

This object and several other objects are obtained in a first aspect of the invention by providing a method for setting an optimum value of a write parameter for use in an optical recording apparatus for writing information on an optical recording medium by means of a radiation beam, the method comprising the steps of:

1) writing a series of test patterns on the recording medium, each pattern being written with a different value of a write power level (P) of the radiation beam,
2) reading the patterns so as to form corresponding read signal portions, and
3) deriving a value of a read parameter from each read signal portion,
4) curve-fitting a plurality of functions, each function defining a relation between the read parameter and the write power level (P), to associated values of the read parameter and the write power level (P), each curve-fitting function having a corresponding initial value of write power level ($P_{ini}$),
5) deriving a corresponding plurality of characteristic write power levels ($P_{char}$) from each of the curve-fitting functions, each characteristic write power level ($P_{char}$) thereby having an associated initial value of the write power level ($P_{ini}$), and
6) setting an optimum value of a write parameter by comparing the plurality of initial values of write power levels ($P_{ini}$) with each value of its associated characteristic write power levels ($P_{char}$).

The invention is particularly but not exclusively advantageous for obtaining at least one optimum value of the write parameter within relatively short time. The optimum value represents an optimum value obtained by the method of the present invention, but nevertheless the optimum value of the write parameter found may not be the very best value of the write parameter obtainable, e.g. a local optimum and not a global optimum may be obtained. Beneficially, problems with non-convergent iterations are avoided.

The read parameter may be a modulation (M) of the amplitude of a read signal derived from information recorded on the recording medium. This modulation (M) is computed from the following expression $$M = ((I_H - I_L)/I_H) \cdot 100,$$

where $I_H$ is the highest level of the amplitude and $I_L$ is the lowest level of the amplitude in the read signal derived from reading information recorded on the information carrier comprising longer marks such as, for example, marks having a length of 14 times the channel bit length when Eight-to-Fourteen Modulation Plus (EFM+) coding is employed.

At least one function of the plurality of curve-fitted functions may be of the form $$P \cdot M = \alpha \cdot (P - \beta),$$

wherein $\alpha$ and $\beta$ have values resulting from the curve-fitting. The characteristic value of the write parameter ($P_{char}$) for the at least one function may be set to be substantially equal to the value of $\beta$ times a first multiplication constant ($\kappa$). Generally speaking, any function of arbitrary shape that defines a relation between the read parameter and the write power level (P)

can be used. However, it should be noted that a straight line can be very easily and accurately curve-fitted. Therefore, arranging the values of the read parameter and of the write power level (P) in such a way that a straight line could be curve-fitted is advantageous. Additionally, the value of β is unambiguously determined from the straight line fitting procedure, which is quite advantageous relative to alternative fitting procedures where several solutions may result.

The first multiplication constant (κ) may be read from an area on the recording medium containing control information indicative of a recording process whereby information can be recorded on said recording medium. Thus, the media manufacturer may provide this information on the optical medium. Alternatively, the multiplication constant (κ) may be determined by the user in a calibration procedure.

The curve-fitting of the at least one function defining a straight line may be carried out in a predetermined fit range of write power levels, where the position of the predetermined fit range may be determined by the initial value of the write power level ($P_{ini}$) associated with each curve-fitting function and a range factor (R), where R is a percentage number. The upper limit of the fit range may be given by $P_{ini}$ times (1+R), and the lower limit of the fit range may be given by $P_{ini}$ times (1−R). Values of the range factor (R) may be 10%, 20%, or 30%. The number of initial values of the write power level ($P_{ini}$) may be 2 to 40, 5 to 30, or 10 to 20.

The value of each of the initial write power levels in the plurality of initial write power levels may be substantially numerical different from each other by a separation constant (S) times an integer. This is advantageous as the information about the initial values of the write power level ($P_{ini}$) may be given as just two numbers.

The information indicative of the plurality of initial write power levels may be read from an area on the recording medium containing control information indicative of a recording process whereby information can be recorded on said recording medium. Thus, the media manufacturer may provide this information on the optical medium in order to facilitate an fast and accurate determination of the optimum write power level ($P_{opt}$) for recording information for the optical medium in question.

The setting of an optimum value of a write parameter in step 6 may be performed by evaluating the numerical difference between each initial value of write power levels ($P_{ini}$) with each value of its associated characteristic write power levels ($P_{char}$), the optimum value of a write parameter being the characteristic write parameter ($P_{char}$) with the lowest numerical difference. This is advantageous as this method is very easy to implement and provides fast results. Alternatively, the setting of an optimum value of the write parameter of step 6 may be performed by finding a coincidence point between a line, where the initial write power level ($P_{ini}$) is equal to the characteristic write power level ($P_{char}$), and a curve fitted to the plurality of points ($P_{ini}$, $P_{char}$) of each initial value of write power level ($P_{ini}$) and its associated characteristic write power level ($P_{char}$). Advantageously, the fitted curve is a straight line.

The method of the invention may provide a method for setting an optimum value ($P_{opt}$) of a write power level (P), of a radiation beam, which method is intended for use in an optical recording apparatus for writing information on an optical recording medium by the radiation beam having the write power level (P), using a method as describe above for setting an optimum value of a write parameter, wherein the optimum value ($P_{opt}$) of the write power level (P) is set to be equal to the optimum value of the write parameter times a second multiplication constant (ρ). Notice, that this definition of the optimum value ($P_{opt}$) of the write power level (P) is different from the disclosure of WO 02/41306, i.e. the multiplication constants are defined differently. The optimum value ($P_{opt}$) of the write power level may be defined as the write power level for which the lowest jitter of the read signal from information recorded on the recording medium is obtained. Additionally, the optimum value ($P_{opt}$) of the write power level may take into account the stability of the read signal against variations around the optimum value ($P_{opt}$) of the write power level. The optimum value ($P_{opt}$) of the write power level may differ depending on the purpose of the recording medium. Thus, the optimum value ($P_{opt}$) of the write power level for one time recording may be different from the optimum value ($P_{opt}$) of the write power level for multiple recordings on the same region of the recording medium.

The second multiplication constant (ρ) may be read from an area on the recording medium containing control information indicative of a recording process whereby information can be recorded on said recording medium. Thus, the optical medium manufacturer may under standardized condition determine the second multiplication constant (ρ) and provide this information on the optical medium.

In a second aspect, the invention provides an optical recording apparatus for implementing the method according to the first aspect of the invention, the apparatus comprising:

a radiation source for emitting a radiation beam having a controllable value of a write power level (P) for recording information on the recording medium, a control unit for recording a series of test patterns, each pattern being recorded with a different value of the write power level, a read unit for reading the patterns and forming corresponding read signal portions, first means for deriving a value of a read parameter from each read signal portion, second means for curve-fitting a function defining a relation between the read parameter and the write power level (P) to the values of the read parameter and of the write power level (P), each curve-fitting function having a corresponding initial value of write power level ($P_{ini}$), and third means for deriving a corresponding plurality of characteristic write power levels ($P_{char}$) from each of the curve-fitting functions, each characteristic write power level ($P_{char}$) thereby having an associated initial value of the write power level ($P_{ini}$), and fourth means for setting an optimum value of a write parameter by comparing the plurality of initial values of write power levels ($P_{ini}$) with each value of its associated characteristic write power levels ($P_{char}$). It is particularly beneficial that the present invention may be applied by means already known in the art, though the way of finding the optimum value of a write parameter of the present invention has several advantages relative to the known way of finding the optimum value of a write parameter.

In a third aspect the invention provides an optical recording medium for recording information by irradiating the recording medium by means of a radiation beam, the recording medium comprising an area containing control information indicative of a recording process whereby information can be recorded on said recording medium, the control information comprising values of recording parameters for the recording process, wherein the control information comprises a information indicative of the plurality of initial write power level ($P_{ini}$) for use in the method according to the first aspect of the invention or the apparatus according to the second aspect of the invention. It is particularly advantageous that the control information may be provided on the recording medium itself as this enable the medium manufacturer to distribute the control information to the user in an efficient manner.

Furthermore, the optical recording medium for recording information by irradiating the recording medium by means of a radiation beam may comprise an area containing control information indicative of a recording process whereby information can be recorded on said recording medium, the control information comprising values of recording parameters for the recording process, wherein the control information comprises at least one of the first ($\rho$) and second multiplication constants ($\kappa$) for use in the method according to the first aspect of the invention.

These and other aspects of the invention will be apparent from and elucidated with reference to the embodiments described hereinafter.

Figure 2:
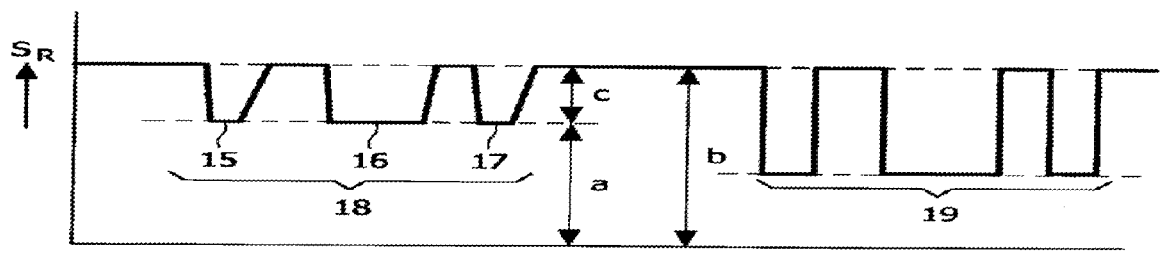
Figure 3:
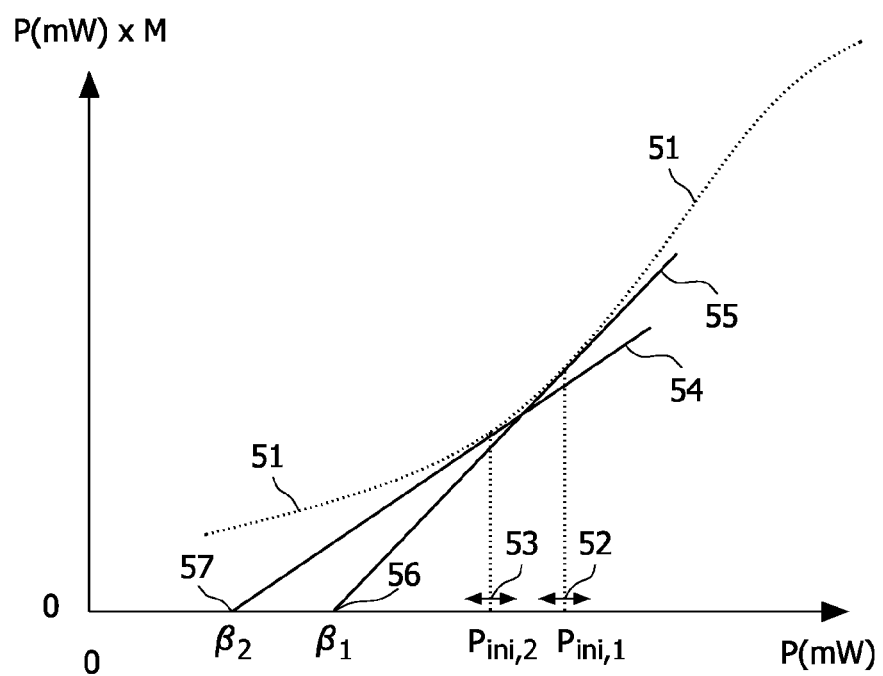
Figure 4:
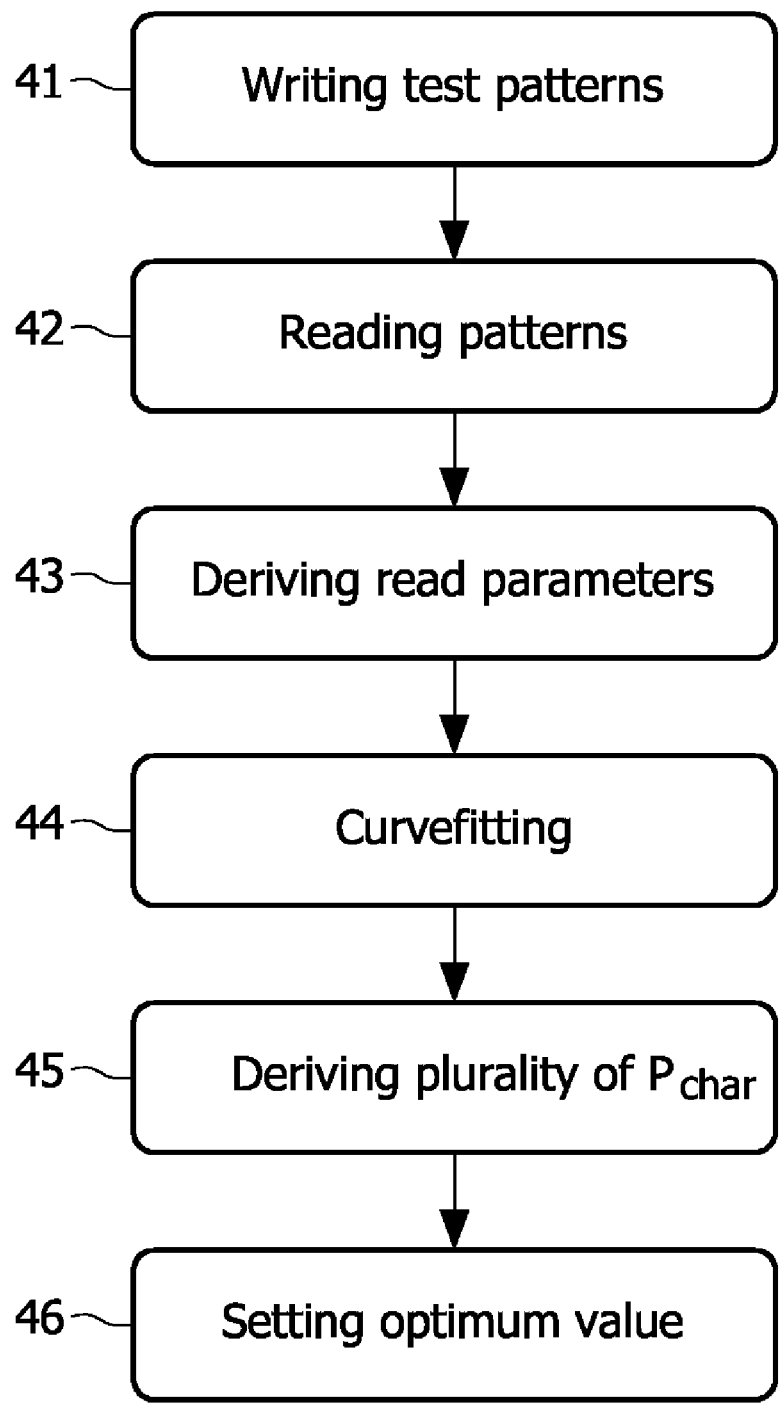
Figure 5:
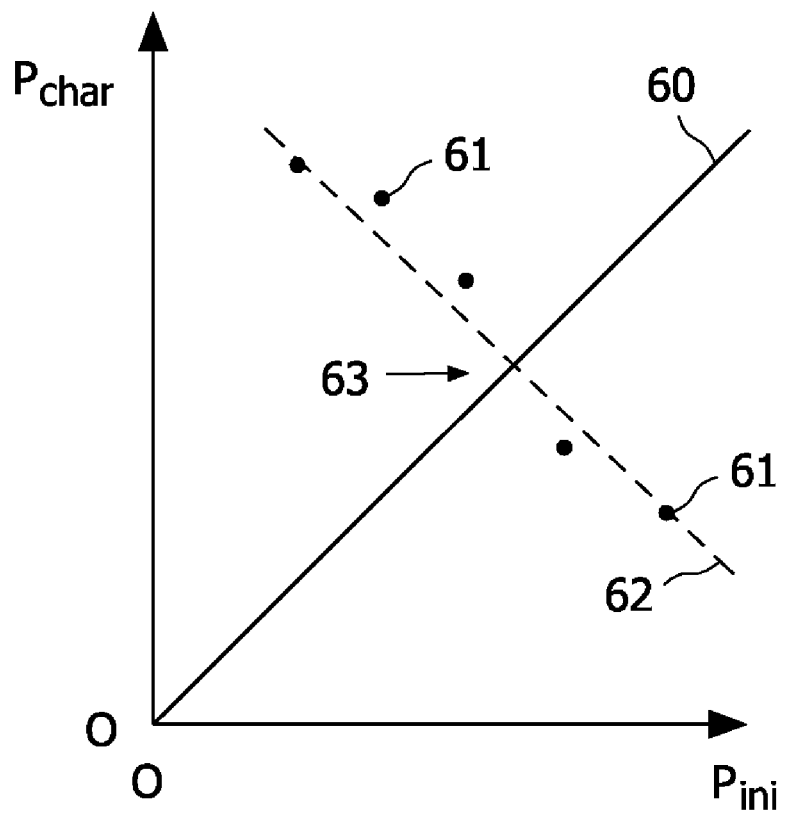

The present invention will now be explained with reference to the accompanying Figures, where FIG. 1 is a diagram of an embodiment of an optical recording apparatus according to the invention, FIG. 2 illustrates two read signal portions from two test patterns, FIG. 3 is a graph showing the measured modulation times the write power as a function of the write power and a plurality of curve-fitted functions, FIG. 4 is a flow-chart of a method according to the invention, and FIG. 5 is a graph used in an embodiment for setting the optimum value of the write parameter according to the invention.

FIG. 1 shows an optical recording apparatus and an optical recording medium 1 according to the invention. The recording medium 1 has a transparent substrate 2 and a recording layer 3 arranged on it. The recording layer 3 comprises a material suitable for recording information by means of a radiation beam 5. The recording material may be of, for example, the magneto-optical type, the phase-change type, the dye type, metal alloys like Cu/Si or any other suitable material. Information may be recorded in the form of optically detectable regions, also called marks, on the recording layer 3. The apparatus comprises a radiation source 4, for example a semiconductor laser, for emitting a radiation beam 5. The radiation beam is directed to the recording layer 3 via a beam splitter 6, an objective lens 7 and the substrate 2. The recording medium may alternatively be air-incident, the radiation beam then being directly incident on recording layer 3 without passing through a substrate. Radiation reflected from the medium 1 is collected by the objective lens 7 and, after passing through the beam splitter 6, falls on a detection system 8, which converts the incident radiation in the electric detector signals. The detector signals are applied to a circuit 9. The circuit 9 derives several signals from the detector signals, such as a read signal $S_R$ representing the information being read from the recording medium 1. The radiation source 4, the beam splitter 6, the objective lens 7, the detection system 8 and circuit 9 together form a read unit 90.

The read signal from the circuit 9 is processed in a first processor 10 in order to derive signals representing a read parameter from the read signal. The derived signals are fed to a second processor 101 and subsequently to a third processor 102 which processors process a series of values of the read parameter and derive therefrom a value for a write power control signal necessary for controlling the laser power level.

The write power control signal is applied to a control unit 12. An information signal 13, representing the information to be recorded on the recording medium 1, is also fed to the control unit 12. The output of the control unit 12 is connected to the radiation source 4. A mark on the recording layer 3 can be recorded by a single radiation pulse, the power of which is determined by the optimum write power level ($P_{opt}$) as determined by the processor 102. Alternatively, a mark can also be recorded by a series of radiation pulses of equal or different length and one or more power levels determined by the write power signal.

A processor is understood to mean any means suitable for performing calculations, for example a microprocessor, a digital signal processor, a hard-wired analog circuit or a field programmable circuit. Moreover, the first processor 10, the second processor 101 and third the processor 102 may be separate devices or, alternatively, may be combined into a single device executing all three processes.

Before recording information on the medium 1 the apparatus sets its write power (P) to the optimum value ($P_{opt}$) by performing a method according to the invention. This method is schematically depicted in the flow-chart shown in FIG. 4.

In a first step 41 the apparatus writes a series of test patterns on the medium 1. The test patterns should be selected so as to give a desired read signal. If the read parameter to be derived from the read signal is the modulation (M) of a read signal portion pertaining to a test pattern, the test pattern should comprise marks sufficiently long to achieve a maximum modulation of the read signal portion. When the information is coded according to the so-called Eight-to-Fourteen Modulation (EFM+), the test patterns preferably comprise the long I11 marks of the modulation scheme. When the information is coded according to the Eight-to-Fourteen Plus Modulation (EFM+), the test patterns should comprise the long I14 marks of this modulation scheme. When the information is coded according to the so-called 17PP modulation, the test patterns preferably comprise the long I8 marks of the modulation scheme. Each test pattern is recorded with a different write power level (P). The range of powers can be selected on the basis of an indicative power level ($P_{ini}$) recorded as control information on the recording medium. Subsequent test patterns may be recorded with a step-wise increased write power level (P) under the control of the control unit 12. The test patterns may be written anywhere on the recording medium. They can alternatively be written in specially provided test areas on the recording medium.

In a second step 42 the recorded test patterns are read by the read unit 90 so as to form a read signal $S_R$. FIG. 2 shows the read signal portions 18 and 19 obtained from two test patterns written at two different write power levels. The patterns shown comprise a short mark, a long mark and a short mark, as denoted by the signal parts 15, 16 and 17, respectively, in both the read signal portion 18 and the read signal portion 19. An actual pattern may comprise a few hundred marks of different or equal length.

In a third step 43 the processor 10 derives from the read signal $S_R$ a read parameter for each read signal portion. A possible read parameter is the ratio of the lowest level of the amplitude of a read signal portion (for read the signal portion 18 indicated by 'a' in FIG. 2) to the maximum level of the amplitude of the same read signal portion (indicated by 'b'). A preferred read parameter is the modulation (M), being the ratio of the maximum peak-to-peak value of a read signal, indicated by 'c', to the maximum amplitude 'b' of the read signal portion.

In a fourth step 44 the processor 101 fits a plurality of functions to associated values of the read parameter and the write power level (P). Each function defines a relation between the read parameter and the write power level (P). As input for each curve fitting function a corresponding initial value of write power level ($P_{ini}$) is provided. The write powers can be taken from the value of the write power control signal during the recording of the test patterns or, alternatively, from a measurement of the radiation power.

In FIG. 3 a graph with a preferred embodiment of the curve-fitting procedure is shown. The vertical axis indicates the write power (P) times the modulation (M), whereas the horizontal axis indicates the write power (P). Each of the points 51 represents a pair of values for the measured modulation (M) times the write power (P) and the write power (P), respectively.

The curve-fitting function may be of many different mathematical forms readily available for person skilled in the art. Thus, a curve, e.g. a polynomial, may be fitted to the power levels around the initial write power level ($P_{ini}$) in question.

In the preferred embodiment of FIG. 3 just two initials write power levels, $P_{ini,1}$ and $P_{ini,2}$, are shown for illustrative purpose. Usually, 10-20 different initials write power levels ($P_{ini}$) are applied but up to several hundreds different initials write power levels ($P_{ini}$) may be applied if necessary. In pre-defined intervals around the initials write power levels, $P_{ini,1}$ and $P_{ini,2}$, indicated schematically by the arrows 52 and 53, the measured points 51 of the graph in FIG. 3 is fitted to a function of the form $$P \cdot M = \alpha \cdot (P - \beta),$$

where $\alpha$ and $\beta$ are fitting constants. The intervals 52 and 53 may be defined as a range fraction (R) of the initials write power levels ($P_{ini}$), e.g. 10%, 20%, 30% or 40% of the initials write power levels ($P_{ini}$), but could also be a pre-defined constant, e.g. 0.1 or 0.2 mW. These fitting functions are straight lines 54 and 55 in the graph of FIG. 3. The values of $\beta$ correspond to the intersections 56 and 57 with the horizontal axis. The straight lines 54 and 55 are to be found by the least-square method or other appropriate mathematical methods.

In a fifth step 45 the processor 102 performs a pre-defined procedure in order to derive a plurality of characteristic write power levels ($P_{char}$) from each of the curve-fitting functions of the fourth step. Hence, each characteristic write power level ($P_{char}$) thereby has an associated initial value of the write power level ($P_{ini}$). In the preferred embodiment the characteristic value of the write power level ($P_{char}$) is given by $$P_{char} = \kappa \cdot \beta,$$

where $\kappa$ is a first multiplication constant. $\kappa$ is read from the optical recording medium. As the value of $\beta$ is dependent on the initial value of the write power level ($P_{ini}$) the characteristic value of the write power level ($P_{char}$) is a function of the initial write power level ($P_{ini}$) in question, i.e. $P_{char,i} = P_{char,i}(P_{ini,i})$, where i is an integer. Notice, that no iterative steps are performed to find the characteristic value of the write power level ($P_{char}$).

In a sixth step 46 the processor 102 performs a pre-defined procedure for setting an optimum value of a write parameter. This is done by comparing the plurality of initial values of write power levels ($P_{ini}$) with each value of its associated characteristic write power levels ($P_{char}$). In a preferred embodiments the comparison is performed by evaluating the numerical difference between each initial value of write power levels ($P_{ini}$) with each value of its associated characteristic write power levels ($P_{char}$). The optimum value of the write parameter is then taken to be the characteristic write parameter ($P_{char}$) with the lowest numerical difference. However, numerous different comparison schemes are readily available to the skilled person in the art, including statistical methods beneficial for reducing the sensitivity of the comparison by inherent scattering of the measured values.

Subsequently, an optimum value ($P_{opt}$) of the write power level (P), of the radiation beam 5 shown in FIG. 1 can be found. The optimum value ($P_{opt}$) of the write power level (P) is set to be equal to the optimum value of the write parameter times a second multiplication constant ($\rho$);

$$P_{opt} = \rho \cdot P_{char}.$$

Hence, an optimum value ($P_{opt}$) of the write power level (P) for writing information on the optical recording media is obtained.

In FIG. 5 a particular interesting embodiment for a comparison procedure applicable in the sixth step of the method according to invention is shown. The vertical axis indicates the value of the characteristic write power levels ($P_{char}$), whereas the horizontal axis indicates the initial values of write power levels ($P_{ini}$). The line 60 is the line where the characteristic write power level ($P_{char}$) is equal to the initial value of write power level ($P_{ini}$), i.e. $P_{char} = P_{ini}$. Associated measured values of ($P_{ini}$, $P_{char}$) are plotted as dots 61. For illustrative purposes only five points 61 are shown. A curve 62 is then fitted to the points 61, advantageously the curve 62 is a linear curve but other appropriate mathematical functions may also be applied. In this comparison scheme, the intersection point 63 between the curve 62 and the line 60 indicates the optimum value of the write parameter. However, in some cases experiments have shown that the fitted curve 62 does not always intersects the line 60, e.g. the fitted curve 62 may have the same slope as the line 60 or the fitting curve 62 may be exclusively located above or below the line 60. In such cases one may apply more advanced analysis known to the skilled person in the field such as finding first or second order derivatives of the fitted curve 62 in order to find an optimum value of the write parameter.

It is contemplated that even though the values of the write power levels are not found by iteration the values of the multiplication constants, i.e. $\rho$ and $\kappa$, may be varied to find an optimum value of the write parameter, possibly to evaluate the stability of found optimum value of the write parameter. Similar, the range fraction (R) may be varied in an iterative manner to assess the found optimum value of the write parameter and its stability.

Although the present invention has been described in connection with the preferred embodiments, it is not intended to be limited to the specific form set forth herein. Rather, the scope of the present invention is limited only by the accompanying claims. In the claims, the term comprising does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for setting an optimum value of a write parameter for use in an optical recording apparatus for writing information on an optical recording medium by means of a radiation beam, the method comprising the steps of:
   1) writing a series of test patterns on the recording medium, each pattern being written with a different value of a write power level (P) of the radiation beam,
   2) reading the test patterns from the recording medium so as to form corresponding read signal portions, and
   3) deriving a value of a read parameter from each read signal portion, 4) curve-fitting a plurality of functions, each function defining a relation between the read parameter and the write power level (P), to associated values of the read parameter and the write power level (P), each curve-fitting function having a corresponding initial value of write power level ($P_{ini}$), 5) deriving a corresponding plurality of characteristic write power levels ($P_{char}$) from each of the curve-fitting functions, each characteristic write power level ($P_{char}$) thereby having an associated initial value of the write power level ($P_{ini}$), and 6) setting an optimum value of a write parameter by comparing the plurality of initial values of write power levels ($P_{ini}$) with each value of its associated characteristic write power levels ($P_{char}$).

2. A method according to claim 1, wherein the read parameter is a modulation (M) of the amplitude of a read signal derived from information recorded on the recording medium.

3. A method according to claim 2, wherein at least one function of the plurality of curve-fitted functions is of the form $P \cdot M = \alpha \cdot (P - \beta)$, wherein $\alpha$ and $\beta$ have values resulting from the curve-fitting, and wherein the value of the characteristic write parameter ($P_{char}$) for said at least one function is set to be equal to the value of $\beta$ times a first multiplication constant ($\kappa$).

4. A method according to claim 3, wherein the first multiplication constant ($\kappa$) is read from an area on the recording medium (1) containing control information indicative of a recording process whereby information can be recorded on said recording medium.

5. A method according to claim 3, wherein the curve-fitting of the at least one function is carried out in a predetermined fit range of write power levels.

6. A method according to claim 5, wherein the position of the predetermined fit range is determined by the initial value of the write power level ($P_{ini}$) associated with each curve-fitting function and a range factor R.

7. A method according to claim 1, wherein the value of each of the initial write power levels ($P_{ini}$) are numerical different from each other by a separation constant (S) times an integer.

8. A method according to claim 1, wherein information indicative of the plurality of initial write power levels ($P_{ini}$) is read from an area on the recording medium containing control information indicative of a recording process whereby information can be recorded on said recording medium.

9. A method according to claim 1, wherein the setting of an optimum value of a write parameter in step 6 is performed by evaluating the numerical difference between each initial value of write power levels ($P_{ini}$) with each value of its associated characteristic write power levels ($P_{char}$), the optimum value of a write parameter being the characteristic write parameter ($P_{char}$) with the lowest numerical difference.

10. A method according to claim 1, wherein the setting of an optimum value of the write parameter of step 6 is performed by finding a coincidence point between a line, where the initial write power level ($P_{ini}$) is equal to the characteristic write power level ($P_{char}$), and a curve fitted to the plurality of points ($P_{ini}$, $P_{char}$) of each initial value of write power level ($P_{ini}$) and its associated characteristic write power level ($P_{char}$).

11. A method for setting an optimum value ($P_{opt}$) of a write power level (P), of a radiation beam, in an optical recording apparatus for writing information on an optical recording medium by the radiation beam having the write power level (P), the method comprising the steps of: setting an optimum value of a write parameter by a method of claim 1, and setting the optimum value ($P_{opt}$) of the write power level (P) to be equal to the set optimum value of the write parameter times a second multiplication constant ($\rho$).

12. A method according to claim 11, wherein the second multiplication constant ($\rho$) is read from an area on the recording medium containing control information indicative of a recording process whereby information can be recorded on said recording medium.

13. An optical recording apparatus for setting an optimum value of a write parameter for writing information on a recording medium, the apparatus comprising:
a radiation source for emitting a radiation beam having a controllable value of a write power level (P) for recording information on the recording medium,
a control unit for recording a series of test patterns, each pattern being recorded with a different value of the write power level,
a read unit (90) for reading the test patterns from the recording medium and forming corresponding read signal portions,
first means for deriving a value of a read parameter from each read signal portion,
second means for curve-fitting functions, each function defining a relation between the read parameter and the write power level (P) to the values of the read parameter and of the write power level (P), each curve-fitting function having a corresponding initial value of write power level ($P_{ini}$), and
third means for deriving a corresponding plurality of characteristic write power levels ($P_{char}$) from each of the curve-fitting functions, each characteristic write power level ($P_{char}$) thereby having an associated initial value of the write power level ($P_{ini}$), and
fourth means for setting an optimum value of a write parameter by comparing the plurality of initial values of write power levels ($P_{ini}$) with each value of its associated characteristic write power levels ($P_{char}$).

14. A method according to claim 1, wherein the the recording medium comprises an area containing control information indicative of a recording process, whereby information can be recorded on said recording medium, the control information comprising values of recording parameters for the recording process, wherein the control information comprises the first multiplication constant ($\kappa$).

15. A method according to claim 3, wherein the recording medium comprising an area containing control information indicative of a recording process whereby information can be recorded on said recording medium, the control information comprising values of recording parameters for the recording process, wherein the control information comprises a first multiplication constant ($\kappa$).

16. A method according to claim 11, wherein the recording medium comprising an area containing control information indicative of a recording process whereby information can be recorded on said recording medium, the control information comprising values of recording parameters for the recording process, wherein the control information comprises the second multiplication constant ($\rho$).

* * * * *